(12) United States Patent
Ota

(10) Patent No.: US 10,562,399 B2
(45) Date of Patent: Feb. 18, 2020

(54) MOTOR CONTROL DEVICE OF VEHICLE

(71) Applicant: ADVICS CO., LTD., Kariya-shi, Aichi-ken (JP)

(72) Inventor: Yuki Ota, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/998,744

(22) PCT Filed: Feb. 15, 2017

(86) PCT No.: PCT/JP2017/005434
§ 371 (c)(1),
(2) Date: Aug. 16, 2018

(87) PCT Pub. No.: WO2017/141939
PCT Pub. Date: Aug. 24, 2017

(65) Prior Publication Data
US 2019/0202308 A1    Jul. 4, 2019

(30) Foreign Application Priority Data

Feb. 16, 2016 (JP) ................. 2016-027234

(51) Int. Cl.
*B60L 15/20* (2006.01)
*H02P 29/64* (2016.01)
(Continued)

(52) U.S. Cl.
CPC ............ *B60L 15/20* (2013.01); *B60T 8/00* (2013.01); *B60T 8/175* (2013.01); *H02P 23/00* (2013.01);
(Continued)

(58) Field of Classification Search
CPC .......... B60W 10/08; B60W 30/18127; B60W 10/06; B60L 2240/423; B60L 7/26
See application file for complete search history.

(56) References Cited

U.S. PATENT DOCUMENTS

2010/0025946 A1* 2/2010 Inoue ................. B60G 15/08
280/6.157
2011/0031939 A1* 2/2011 Funaba et al.
(Continued)

FOREIGN PATENT DOCUMENTS

| JP | 2008068650 A | 3/2008 |
|----|--------------|--------|
| JP | 2010246207 A | 10/2010 |
| JP | 2012080667 A | 4/2012 |

OTHER PUBLICATIONS

International Search Report (PCT/ISA/210) dated May 9, 2017, by the Japanese Patent Office as the International Searching Authority for International Application No. PCT/JP2017/005434.

*Primary Examiner* — Shawki S Ismail
*Assistant Examiner* — Zoheb S Imtiaz
(74) *Attorney, Agent, or Firm* — Buchanan Ingersoll & Rooney PC

(57) ABSTRACT

A motor control device is provided with: an electric motor which drives an applying mechanism for applying torque to the wheels of a vehicle, and has three coils; a drive circuit that supplies current individually to the three coils; and a controller that controls the drive circuit on the basis of the operation amount of an operating member of the vehicle, and adjusts the output of the electric motor. When the vehicle is stopped, the controller executes swing control to periodically increase or decrease the rotary motion of the electric motor, even if the constant state of the operation amount is continued after the operation amount is constant, and the power generated by the applying mechanism and the (Continued)

power received by the applying mechanism are equalized and the rotary motion of the electric motor has stopped.

1 Claim, 7 Drawing Sheets

(51) Int. Cl.
| | |
|---|---|
| H02P 29/68 | (2016.01) |
| H02P 27/08 | (2006.01) |
| H02P 23/00 | (2016.01) |
| B60T 8/00 | (2006.01) |
| B60T 8/175 | (2006.01) |
| B60T 8/40 | (2006.01) |
| B60T 8/17 | (2006.01) |
| B60T 7/12 | (2006.01) |

(52) U.S. Cl.
CPC ............ *H02P 27/085* (2013.01); *H02P 29/64* (2016.02); *H02P 29/68* (2016.02); *B60L 2220/00* (2013.01); *B60T 7/122* (2013.01); *B60T 8/17* (2013.01); *B60T 8/4081* (2013.01); *B60T 2201/06* (2013.01); *B60Y 2200/91* (2013.01); *Y02T 10/642* (2013.01)

(56) References Cited

U.S. PATENT DOCUMENTS

2011/0316455 A1* 12/2011 Maruyama ............. H02P 29/60
                                                         318/373
2012/0217849 A1   8/2012 Lee
2013/0162181 A1*  6/2013 Okawa .................... H02P 3/20
                                                         318/373

* cited by examiner

MOTOR CONTROL DEVICE OF VEHICLE

TECHNICAL FIELD

The present invention relates to a motor control device of a vehicle configured to control an electric motor having three-phase coils.

BACKGROUND ART

Patent Literature 1 describes, with an aim to "suppress a temperature rise in an inverter while avoiding generation of electromagnetic noise as much as possible", that "a PWM mode selection unit 280 normally selects an asynchronous PWM, whereas when an element temperature Tsw of an inverter 14 rises, it selects a synchronous PWM. A carrier wave control unit 270 sets a carrier frequency fc during the asynchronous PWM to a relatively high prescribed frequency by which the electromagnetic noise is less likely to be detected, whereas it sets the carrier frequency fc during the synchronous PWM based on a rotational frequency $\omega$e such that a periodicity (carrier number) k of carrier waves included in one period of an electrical angle of an AC motor M1 according to a mode selection of the PWM mode selection unit 280".

Now, in a situation where a stopped state of a vehicle is maintained, such as while waiting for a traffic signal, a state may take place where an electric motor used in a brake control device has a rotary speed of zero (rotation angle maintaining a certain value) and outputs torque (which is called a locked state). In a case where braking is performed intensely (case where a braking operation is large) under this locked state, excessive current continues to be supplied over a long period of time to one of three coils and to a switching element for supplying electricity to this coil. From the aspect of temperature rise in the coil and the switching element, such a situation is desirably avoided.

CITATIONS LIST

Patent Literature

Patent Literature 1: JP 2010-246207 A

SUMMARY OF INVENTION

Technical Problems

An aim of the present invention is to provide a technique that can suppress excessive temperature rise in a coil (and an electric motor) as well as a switching element (and a drive circuit) caused by continuous electricity supply to the particular coil and switching element in a locked state where rotation of an electric motor is stopped.

Solutions to Problems

A motor control device of a vehicle according to the present invention includes: an electric motor (MTR) including three coils (CLU, CLV, CLW) and configured to drive an applying mechanism (TFK) that applies torque to a wheel (WH) of the vehicle; a drive circuit (DRV) configured to supply current independently to each of the three coils (CLU, CLV, CLW); and a controller (CTL) configured to adjust an output of the electric motor (MTR) by controlling the drive circuit (DRV) based on an operation amount (Bpa) of an operating member (BP) of the vehicle.

In the motor control device of a vehicle according to the present invention, in a case where the vehicle is stopped, and after a rotary motion of the electric motor (MTR) is stopped by the operation amount (Bpa) being constant and a force which the applying mechanism (TFK) generates and a force which the applying mechanism (TFK) receives being balanced, the controller (CTL) performs a swing control (FLC, S100, S200) that periodically increases and decreases the rotary motion of the electric motor (MTR) even if a state where the operation amount (Bpa) is constant continues to take place.

According to the above configuration, continuous electricity supply to particular motor coil and switching element is avoided in a locked state of the electric motor MTR (state where the force generated by the applying mechanism TFK and the force received by the applying mechanism TFK are balanced, by which the rotary motion of the electric motor MTR stops), and thus, excessive temperature rise in the electric motor MTR and the drive circuit DRV can be suppressed.

The motor control device of a vehicle according to the present invention is further provided with a rotation angle sensor (MKA) configured to detect a rotation angle (Mka) of the electric motor (MTR), in which the controller (CTL): sets the rotation angle (Mka) at a time when the rotary motion of the electric motor (MTR) has stopped as a reference angle (mks), sets an upper limit angle (mku) to a side toward which the force which the applying mechanism (TFK) generates increases based on the reference angle (mks), and performs the swing control (FLC, S100, S200) in a range of the rotation angle (Mka) ranging from the reference angle (mks) to the upper limit angle (mku).

According to the above configuration, the rotation angle Mka at the time when the swing control is started (that is, the time when the rotary motion of the electric motor MTR has stopped) is set as the reference angle mks, the upper limit angle mku is set on the side therefrom toward which the force which the applying mechanism TFK generates increases (for example, a side toward which a braking liquid pressure increases), and the swing control is performed in the range that ranges from the reference angle mks to the upper limit angle mku. Since the rotation angle Mka is controlled so as not to go below the reference angle mks, braking torque can be ensured with certainty in response to a braking request from a driver.

DESCRIPTION OF EMBODIMENTS

Figure 1:
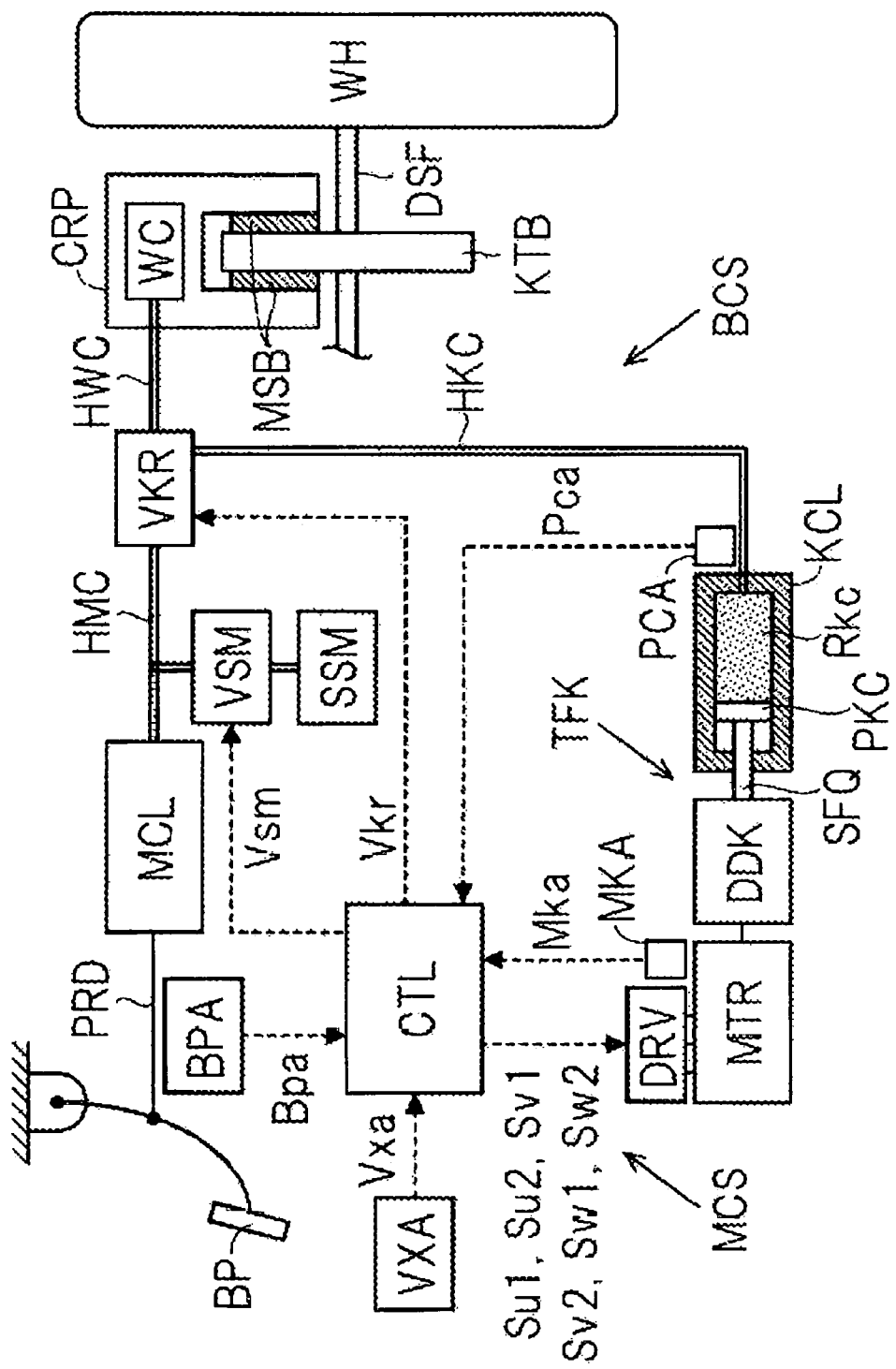
FIG. 1 is an overall configuration diagram for explaining a first embodiment of a brake control device provided with a motor control device according to the present invention.

First Embodiment of Brake Control Device Provided with Motor Control Device According to the Present Invention A brake control device BCS provided with a motor control device MCS according to the present invention will be described with reference to an overall configuration diagram of FIG. 1. A vehicle provided with the brake control device BCS is provided with a braking operation member BP, an operation amount acquiring means BPA, a vehicle speed acquiring means VXA, a control means CTL, a master cylinder MCL, a stroke simulator SSM, simulator shutoff valve VSM, a motor control device MCS, a torque applying mechanism TFK, a switch valve VKR, a master cylinder pipe HMC, a wheel cylinder pipe HWC, and a pressure application cylinder pipe HKC. Further, each wheel WH of the vehicle is provided with a brake caliper CRP, a wheel cylinder WC, a rotary member KTB, and friction members MSB.

The braking operation member (for example, a brake pedal) BP is a member that a driver operates to decelerate the vehicle. With the braking operation member BP being operated, braking torque of the wheels WH is adjusted and braking forces are generated in the wheels WH. Specifically, each wheel WH of the vehicle has the rotary member (for example, a brake disk) KTB fixed thereto. The brake caliper CRP is arranged on both sides of the rotary member KTB. Further, the brake caliper CRP is provided with the wheel cylinder WC. The friction members (for example, brake pads) MSB are pressed against the rotary member KTB by a pressure (liquid pressure) of braking fluid in the wheel cylinder WC being increased. The rotary member KTB and the wheel WH are fixed via a fixation shaft DSF, and thus, a frictional force generated at this occasion generates braking torque (braking force) in the wheel WH.

The operation amount acquiring means BPA is provided in the braking operation member BP. The operation amount acquiring means BPA allows an operation amount (braking operation amount) Bpa of the braking operation member BP by a driver to be acquired (detected). Specifically, at least one of a liquid pressure sensor configured to detect a pressure of the master cylinder MCL, an operation displacement sensor configured to detect a displacement by the operation on the braking operation member BP, and an operation force sensor configured to detect an operation force on the braking operation member BP is employed as the operation amount acquiring means BPA. That is, it is a collective term for the master cylinder liquid pressure sensor, the operation displacement sensor, and the operation force sensor. Thus, the braking operation amount Bpa is determined based on at least one of the liquid pressure of the master cylinder MCL, the operation displacement of the braking operation member BP, and the operation force on the braking operation member BP. The operation amount Bpa is input to the control means CTL.

The vehicle speed acquiring means VXA acquires a traveling speed Vxa of the vehicle. The vehicle speed Vxa is calculated based on an output revolution of a transmission or a change in a vehicle position detected by a global positioning system. Further, the vehicle speed Vxa is calculated based on detection results (wheel speeds) of wheel speed sensors VWA (not shown) provided on the wheels WH. Further, a result (traveling speed) Vxa calculated in another device may be acquired via a communication bus. Therefore, the vehicle speed acquiring means VXA is a collective term for the acquiring means (wheel speed sensor VWA, etc.) as above. The vehicle speed Vxa is input to the control means CTL.

The control means (which is also termed a controller) CTL controls the torque applying mechanism TFK, the shutoff valve VSM, and the switch valve VKR to be described later based on the braking operation amount Bpa and the vehicle speed Vxa. Specifically, the control means CTL has a control algorithm for controlling the electric motor MTR, the shutoff valve VSM, and the switch valve VKR programmed in its microprocessor, and calculates signals for controlling them.

In a case where the operation amount Bpa becomes equal to or greater than a prescribed value bp0, the control means CTL outputs a drive signal Vsm that sets the shutoff valve VSM in an open position and further outputs a drive signal Vkr by which the switch valve VKR sets the pressure application cylinder pipe HKC and the wheel cylinder pipe HWC in a communicated state. In this case, the master cylinder MCL is set to a communicated state with the simulator SSM, and a pressure application cylinder KCL is set to a communicated state with the wheel cylinder WC. Thus, the liquid pressure in the wheel cylinder WC is controlled by the torque applying mechanism TFK.

The master cylinder MCL is connected to the braking operation member BP via a piston rod PRD. The master cylinder MCL converts an operation force on the braking operation member BP (brake pedaling force) to a liquid pressure. The master cylinder MCL is connected with the master cylinder pipe HMC, and when the braking operation member BP is operated, braking liquid is discharged (pumped) from the master cylinder MCL to the master cylinder pipe HMC. The master cylinder pipe HMC is a fluid passage connecting the master cylinder MCL and the switch valve VKR.

The stroke simulator (which may simply be termed a simulator) SSM is provided to generate the operation force in the braking operation member BP. The simulator shutoff valve (which may simply be termed a shutoff valve) VSM is provided between a liquid pressure chamber in the master cylinder MCL and the simulator SSM. The shutoff valve VSM is a dual-position electromagnetic valve having an open position and a closed position. In a case where the shutoff valve VSM is at the open position, the master cylinder MCL and the simulator SSM come to be in the communicated state, and in a case where the shutoff valve VSM is at the closed position, the master cylinder MCL and the simulator SSM come to be in a shutoff state (non-communicated state). The shutoff valve VSM is controlled by the drive signal Vsm from the control means CTL. As the shutoff valve VSM, a normally-closed electromagnetic valve (NC valve) may be employed.

A piston and an elastic body (for example, a compression spring) is provided inside the simulator SSM. The braking liquid is moved from the master cylinder MCL to the simulator SSM, and the piston is pressed by the inflowing braking liquid. A force is applied to the piston by the elastic body in a direction in which the inflow of the braking liquid is inhibited. The elastic body forms the operation force (for example, the brake pedaling force) in the case where the braking operation member BP is operated.

<<Motor Control Device MCS>>

The motor control device MCS drives the torque applying mechanism TFK. The motor control device MCS is configured of the control means CTL, the drive circuit DRV, and the electric motor MTR.

The control means CTL is configured of an electric circuit board on which the microprocessor and the like are mounted, and the control algorithm programmed in the microprocessor. The control means CTL outputs drive signals (Su1, etc.) for driving the electric motor MTR to the drive circuit DRV based on the operation amount Bpa, the vehicle speed Vxa, the rotation angle Mka, and the actual liquid pressure Pca.

The drive circuit DRV is an electric circuit board on which switching elements (power semiconductor devices) for driving the electric motor MTR are mounted. Specifically, the drive circuit DRV has a three-phase bridge circuit BRG formed therein, and an electricity supply state to the electric motor MTR is controlled based on the drive signals (Su1, etc.). The drive circuit DRV is provided with electricity supply amount acquiring means (current sensors) IMA that acquire (detect) actual electricity supply amounts (electricity supply amounts of respective phases) Iua, Iva, Iwa for the electric motor MTR. The electricity supply amounts (detected values) Iua, Iva, Iwa of the respective phases are input to the control means CTL.

The electric motor MTR is a power source for the pressure application cylinder KCL (which is a part of the torque applying mechanism TFK) to adjust pressures (apply or reduce pressures) of the braking liquid in the wheel cylinders WC. As the electric motor MTR, a three-phase brushless motor is employed. The electric motor MTR includes three coils CLU, CLV, CLW and is driven by the drive circuit DRV. The electric motor MTR is provided with a rotation angle acquiring means (rotation angle sensor) MKA that acquires (detects) a rotor position (rotation angle) Mka of the electric motor MTR. The rotation angle Mka is input to the control means CTL. The motor control device MCS has been described above.

<<Torque Applying Mechanism TFK>>

The torque applying mechanism TFK uses the motor control device MCS as its power source and discharges (pumps) the braking liquid to the pressure application cylinder pipe HKC. Further, the torque applying mechanism TFK applies braking torque (braking force) to the wheels WH by using the pumped braking liquid pressure. The torque applying mechanism TFK is configured of a power transfer mechanism DDK, an output rod SFQ, the pressure application cylinder KCL, a pressure application piston PKC, and a liquid pressure acquiring means PCA.

The power transfer mechanism DDK reduces rotary power of the electric motor MTR and further performs conversion to linear power to output it to the output rod SFQ. Specifically, the power transfer mechanism DDK is provided with a reduction gear (not shown), and the rotary power from the electric motor MTR is reduced and output to a screw member (not shown). Further, the screw member converts the rotary power to the linear power for the output rod SFQ. That is, the power transfer mechanism DDK is a rotary-linear converting mechanism.

The output rod SFQ has the pressure application piston PKC fixed thereto. The pressure application piston PKC is inserted to an inner hole of the pressure application cylinder KCL, and a combination of a piston and a cylinder is thereby formed. Specifically, a seal member (not shown) is provided on an outer periphery of the pressure application piston PKC, and liquid tightness with the inner hole (inner wall) of the pressure application cylinder KCL is thereby ensured. That is, a fluid chamber Rkc (which will be termed a "pressure application chamber Rkc") defined by the pressure application cylinder KCL and the pressure application piston PKC is formed. The pressure application chamber Rkc is connected to the pressure application cylinder pipe HKC. The pressure application piston PKC is moved along a center axis direction, by which a volume of the pressure application chamber Rkc changes. This volume change moves the braking liquid between the pressure application cylinder KCL and the wheel cylinder WC. The liquid pressure in the wheel cylinder WC is adjusted by inputting and outputting the braking liquid to and from the pressure application cylinder KCL.

The liquid pressure acquiring means (liquid pressure sensor) PCA is provided on the pressure application cylinder KCL to acquire (detect) the liquid pressure Pca of the pressure application chamber Rkc. The actual liquid pressure Pca is input to the control means CTL. The torque applying mechanism TFK has been described above.

The switch valve VKR switches between a state in which the wheel cylinders WC are connected to the master cylinder MCL and a state in which the wheel cylinders WC are connected to the pressure application cylinder KCL. The switch valve VKR is controlled based on the drive signal Vkr from the control means CTL. Specifically, in a case where the braking operation is not being performed (Bpa<bp0), the wheel cylinder pipe HWC is set to be in the communicated state with the master cylinder pipe HMC through the switch valve VKR, and is set to be in the non-communicated (shutoff) state with the pressure application cylinder pipe HKC. Here, the wheel cylinder pipe HWC is a fluid passage connected to the wheel cylinder WC. When the braking operation is performed (that is, when a state of Bpa≥bp0 is realized), the switch valve VKR is magnetically excited based on the drive signal Vkr, the communication between the wheel cylinder pipe HWC and the master cylinder pipe HMC is shut off, and the wheel cylinder pipe HWC and the pressure application cylinder pipe HKC are brought to the communicated state.

The brake caliper (which may simply be termed a caliper) CRP is provided in each wheel WH, provides the wheel WH with the braking torque, and generates the braking force. As the caliper CRP, a floating caliper may be employed. The caliper CRP is configured to hold the rotary member (for example, brake disk) KTB by two friction members (for example, brake pads) MSB. The wheel cylinder WC is provided in each caliper CRP. The liquid pressure inside the wheel cylinder WC is adjusted, by which the piston in the wheel cylinder WC is moved relative to the rotary member KTB (moved forward or backward). The movement of this piston causes the friction members MSB to be pressed against the rotary member KTB to generate a frictional force.

In FIG. 1, a configuration of a disk-type braking device (disk brake) is exemplified. In this case, the friction members MSB are brake pads and the rotary member KTB is a brake disk. Instead of the disk-type braking device, a drum-type braking device (drum brake) may be employed. In a case of the drum brake, a brake drum is employed instead of the caliper CRP. Further, the friction members MSB are brake shoes and the rotary member KTB is a brake drum.

<Three-Phase Brushless Motor MTR and Drive Circuit DRV Thereof>

Figure 2:
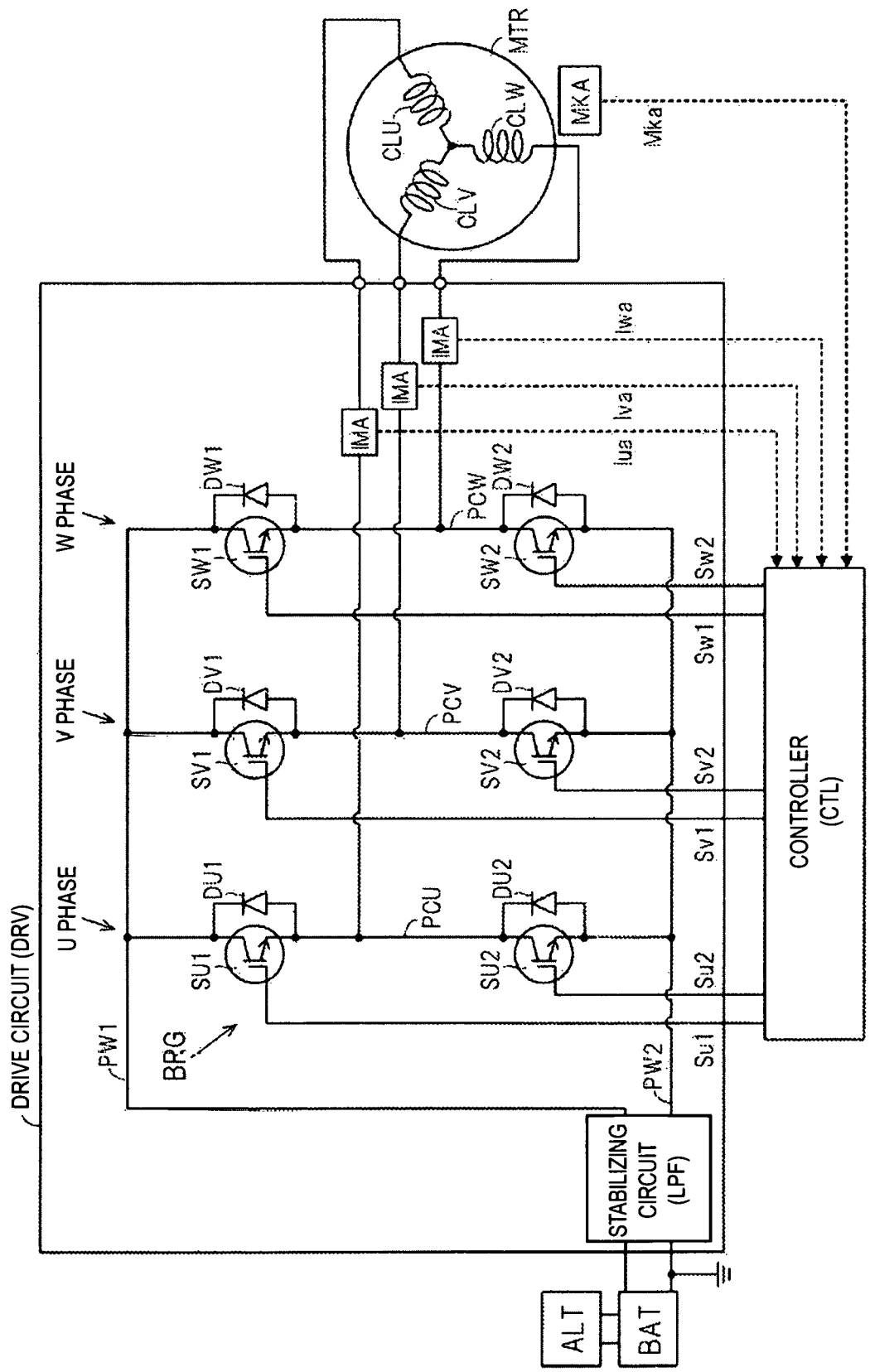
FIG. 2 is a circuit diagram for explaining a three-phase brushless motor and its drive circuit.

The three-phase brushless motor (which may simply be termed an electric motor) MTR and the drive circuit DRV thereof will be described with reference to a circuit diagram of FIG. 2.

In the electric motor MTR, magnets are arranged on a rotor side, and a coil circuit (coils) is arranged on a stator side. In the electric motor MTR, commutation is performed by the drive circuit DRV at timings according to magnetic poles of the rotor and rotary drive is performed thereby. The electric motor MTR is a three-phase brushless motor having the three coils, namely the U phase coil CLU, the V phase coil CLV, and the W phase coil CLW.

The electric motor MTR is provided with the rotation angle sensor MKA that detects the rotation angle (rotor position) Mka of the electric motor MTR. As the rotation angle sensor MKA, a Hall element type is employed. Further, as the rotation angle sensor MKA, a variable reluctance resolver may be employed. The detected rotation angle Mka is input to the control means CTL.

The drive circuit DRV is an electric circuit that drives the electric motor MTR. The drive circuit DRV drives the electric motor MTR based on the drive signals Su1, Su2, Sv1, Sv2, Sw1, Sw2 for the respective phases from the control means CTL. The drive circuit DRV is configured of the three-phase bridge circuit (which may simply be termed a bridge circuit) BRG formed by six switching elements (power transistors) SU1, SU2, SV1, SV2, SW1, SW2 and a stabilizing circuit LPF.

A rechargeable battery BAT is connected via the stabilizing circuit LPF to an input side of the three-phase bridge circuit (which may also be termed an inverter circuit) BRG, and the electric motor MTR is connected to an output side of the bridge circuit BRG. In the bridge circuit BRG, the three phases (U phase, V phase, and W phase) are formed by setting a voltage bridge circuit having an upper and lower arm configuration that serially connects the switching elements as one phase. Upper arms of the three phases are connected to a power line PW1 connected to a positive electrode side of the rechargeable battery BAT. Further, lower arms of the three phases are connected to a power line PW2 connected to a negative electrode side of the rechargeable battery BAT. In the bridge circuit BRG, the upper and lower arms of each phase are connected to the power lines PW1, PW2 in parallel with the rechargeable battery BAT.

The U-phase upper arm has a flyback diode DU1 connected in inverse parallel to the switching element SU1, and the U-phase lower arm has a flyback diode DU2 connected in inverse parallel to the switching element SU2. Similarly, the V-phase upper arm has a flyback diode DV1 connected in inverse parallel to the switching element SV1, and the V-phase lower arm has a flyback diode DV2 connected in inverse parallel to the switching element SV2. Further, the W-phase upper arm has a flyback diode DW1 connected in inverse parallel to the switching element SW1, and the W-phase lower arm has a flyback diode DW2 connected in inverse parallel to the switching element SW2. Connection portions PCU, PCV, PCW of the upper arms and the lower arms of the respective phases form output ends (AC output ends) of the bridge circuit BRG. The electric motor MTR is connected to these output ends.

The six switching elements SU1 to SW2 are elements that can turn on and off a part of an electric circuit. For example, MOS-FETs and IGBTs may be used as the switching elements SU1 to SW2. In the brushless motor MTR, the switching elements SU1 to SW2 configuring the bridge circuit BRG are controlled based on the rotation angle (rotor position) Mka. Further, directions of electricity supply amounts of the coils CLU, CLV, CLW of each of the three phases (U phase, V phase, and W phase) (that is, magnetic excitation directions thereof) are sequentially switched, and the electric motor MTR is thereby driven. That is, a rotation direction (forward direction or reverse direction) of the brushless motor MTR is determined by the relation between the rotor and a position where magnetic excitation is caused. Here, the forward direction of the electric motor MTR is a rotation direction corresponding to an increase of the actual liquid pressure Pca, and the reverse direction of the electric motor MTR is a rotation direction corresponding to a decrease in the actual liquid pressure Pca.

The electricity supply amount acquiring means (current sensors) IMA for detecting the actual electricity supply amounts (for example, current values) Iua, Iva, Iwa between the bridge circuit BRG and the electric motor MTR are provided respectively for the three phases. The detected electricity supply amounts Iua, Iva, Iwa of the respective phases are input to the controller CTL.

The drive circuit DRV receives power supply from the power source (rechargeable battery BAT and generator ALT). To reduce swing of the supplied power (voltage), the drive circuit DRV is provided with the stabilizing circuit (which may also be termed a noise reduction circuit) LPF. The stabilizing circuit LPF is configured of a combination of at least one condenser (capacitor) and at least one inductor (coil), and is a so-called LC circuit (which may also be termed an LC filter).

<Processes in Control Means CTL>

Figure 3:
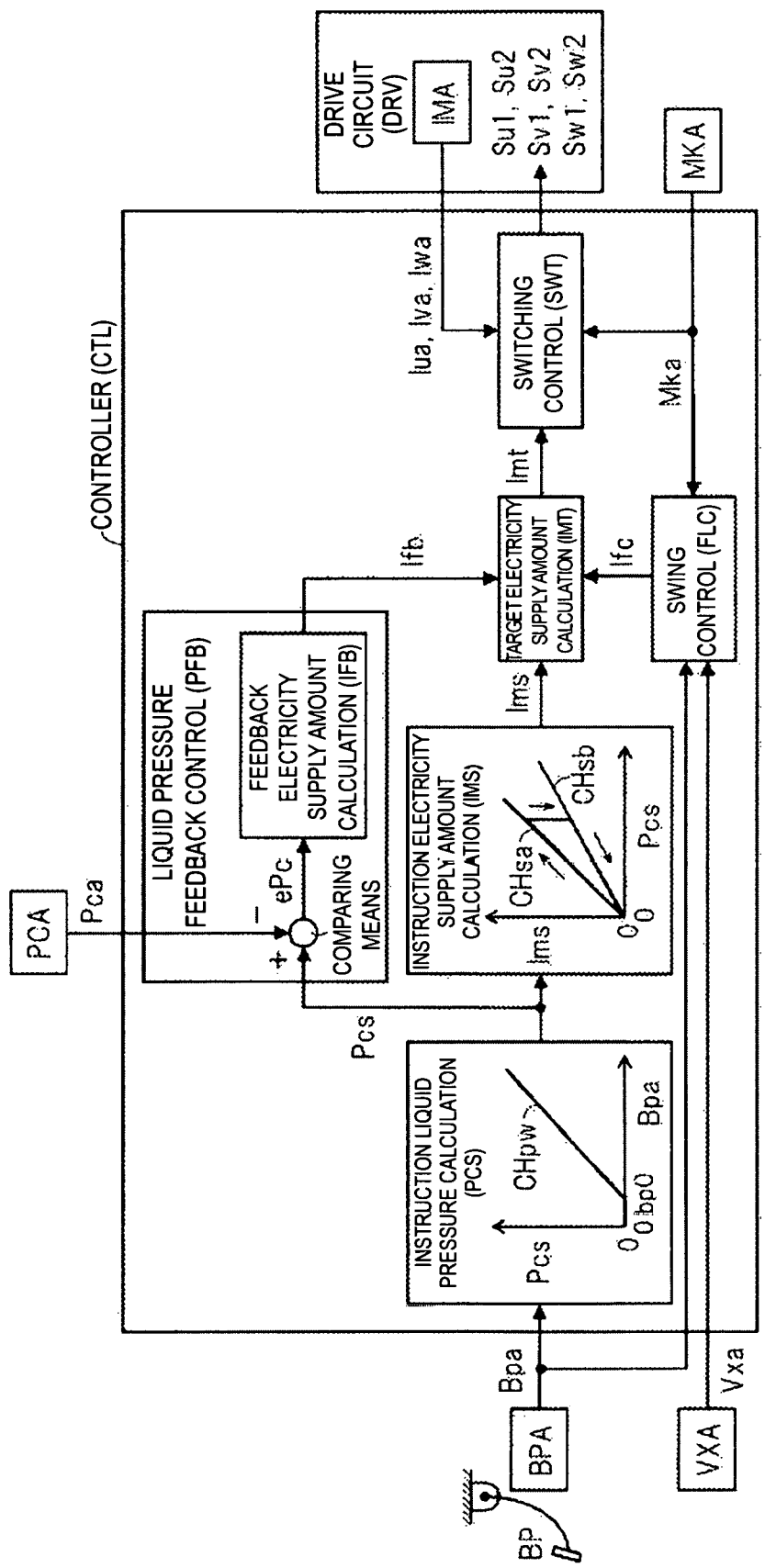
FIG. 3 is a functional block diagram for explaining processes in control means.

Processes in the control means (controller) CTL will be described with reference to a functional block diagram of FIG. 3. The control means CTL calculates the signals (drive signals) Su1, Su2, Sv1, Sv2, Sw1, Sw2 for driving the six switching elements SU1, SU2, SV1, SV2, SW1, SW2. The control means CTL is configured of an instruction liquid pressure calculation block PCS, a target liquid pressure calculation block PWT, an instruction electricity supply amount calculation block IMS, a liquid pressure feedback control block PFB, a swing control block FLC, a target electricity supply amount calculation block IMT, and a switching control block SWT.

In the instruction liquid pressure calculation block PCS, the instruction liquid pressure Pcs is calculated based on the braking operation amount Bpa and a calculation characteristic (calculation map) CHpw. Here, the instruction liquid pressure Pcs is a target value of the braking liquid pressure generated by the torque applying mechanism TFK. Specifically, in the calculation characteristic CHpw, the instruction liquid pressure Pcs is calculated as zero in a range where the braking operation amount Bpa is equal to or greater than zero (corresponding to a case where no braking operation is performed) and less than a prescribed value bp0, and the instruction liquid pressure Pcs is calculated to increase from zero according to the increase in the operation amount Bpa in a range where the operation amount Bpa is equal to or greater than the prescribed value bp0. Here, the prescribed value bp0 is a value that corresponds to "play" of the braking operation member BP.

In the instruction electricity supply amount calculation block IMS, the instruction electricity supply amount Ims of the electric motor MTR (target value of the electricity supply amount for controlling the electric motor MTR) for driving the torque applying mechanism TFK is calculated based on the instruction liquid pressure Pcs and preset calculation characteristics (calculation map) CHsa, CHsb. The calculation map for the instruction electricity supply amount Ims is configured of two characteristics CHsa, CHsb by considering hysteresis.

Here, the "electricity supply amount" is a state quantity (variable) for controlling the output torque of the electric motor MTR. Since the electric motor MTR outputs the torque that is substantially proportional to current, a current target value of the electric motor MTR may be used as the target value of the electricity supply amount (target electricity supply amount). Further, since the current increases as a result of increasing a supplied voltage to the electric motor MTR, a supplied voltage value may be used as the target electricity supply amount. Moreover, since the supplied voltage value may be modulated by a duty ratio in pulse width modulation, this duty ratio (ratio of electricity supplied time per cycle) may be used as the electricity supply amount.

In the liquid pressure feedback control block PFB, a feedback electricity supply amount Ifb of the electric motor MTR is calculated based on the target value (instruction liquid pressure) Pcs of the liquid pressure and the actual value (detected value) Pca of the liquid pressure. Here, the liquid pressure actual value Pca is the actual value (actual liquid pressure) of the liquid pressure acquired (detected) by the liquid pressure sensor PCA. In the liquid pressure feedback control block PFB, a deviation ePc of the instruction liquid pressure Pcs and the actual liquid pressure Pca is calculated. This liquid pressure deviation ePc is differentiated and integrated. Then, the deviation ePc itself, a differentiated value of the deviation ePc, and an integrated value of the deviation ePc are multiplied by respective gains Kp, Kd, Ki, by which the feedback electricity supply amount Ifb is calculated. In the liquid pressure feedback control block PFB, a so-called PID control based on the liquid pressure is performed so that the actual value (detected value) Pca of the liquid pressure matches the target value (instruction liquid pressure) Pcs of the liquid pressure.

In the swing control block FLC, a swing electricity supply amount Ifc for swing control to suppress overheating of the electric motor MTR and the drive circuit DRV is calculated based on the operation amount Bpa, the vehicle speed Vxa, and the rotation angle Mka. Here, in the "swing control", in a case where the vehicle is stopped, and after a rotary motion of the electric motor MTR is stopped by the braking operation amount Bpa being constant and a force which the torque applying mechanism TFK generates and a force which the torque applying mechanism TFK receives being balanced, the rotary motion of the electric motor MTR is periodically increased and decreased even if a state where the braking operation amount Bpa is constant continues to take place. In the swing control block FLC, the target value Ifc of the electricity supply amount for performing this swing control is calculated. Details of the process in the swing control block FLC will be described later.

In the target electricity supply amount calculation block IMT, a target electricity supply amount Imt, which is a final target value of the electricity supply amount, is calculated based on the instruction electricity supply amount Ims, the feedback electricity supply amount Ifb, and the swing electricity supply amount Ifc. Specifically, in a case where the swing control is not performed, the feedback electricity supply amount Ifb is added to the instruction electricity supply amount Ims, and a sum thereof is calculated as the target electricity supply amount Imt (that is, Imt=Ims+Ifb). On the other hand, in a case where the swing control is performed, the swing electricity supply amount Ifc is added to the instruction electricity supply amount Ims, and a sum thereof is calculated as the target electricity supply amount Imt (that is, Imt=Ims+Ifc). This is for preventing the swing electricity supply amount Ifc from being cancelled by Ifb in the case where the swing control is performed.

Further, in the target electricity supply amount calculation block IMT, the feedback electricity supply amount Ifb and the swing electricity supply amount Ifc are added to the instruction electricity supply amount Ims, and a sum thereof is calculated as the target electricity supply amount Imt (that is, Imt=Ims+Ifb+Ifc). Further, in the case where the swing control is not performed, the swing electricity supply amount Ifc may be calculated as zero, and in the case where the swing control is performed, the feedback electricity supply amount Ifb may be determined to maintain zero.

In the target electricity supply amount calculation block IMT, a sign (positivity or negativity of the value) of the target electricity supply amount Imt is determined based on the direction along which the electric motor MTR is to rotate (that is, increasing/decreasing direction of the liquid pressure). Further, a magnitude of the target electricity supply amount Imt is calculated based on the rotary power which the electric motor MTR is to output (that is, increasing/decreasing amount of the liquid pressure). Specifically, in a case where the braking liquid pressure is to be increased, the sign of the target electricity supply amount Imt is calculated as a positive sign (Imt>0), and the electric motor MTR is driven in the forward direction. On the other hand, in a case where the braking liquid pressure is to be decreased, the sign of the target electricity supply amount Imt is determined as a negative sign (Imt<0), and the electric motor MTR is driven in the reverse direction. Further, control is performed such that the output torque (rotary power) of the electric motor MTR becomes larger for a greater absolute value of the target electricity supply amount Imt, and the output torque becomes smaller for a smaller absolute value of the target electricity supply amount Imt.

In the switching control block SWT, the drive signals Su1, Su2, Sv1, Sv2, Sw1, Sw2 (which may be denoted as "Su1 to Sw2") for performing pulse width modulation on the respective switching elements SU1, SU2, SV1, SV2, SW1, SW2 (which may be denoted as "SU1 to SW2") are calculated based on the target electricity supply amount Imt and the rotation angle Mka, and are output to the drive circuit DRV.

Specifically, firstly, target values Iut, Ivt, Iwt of the electricity supply amounts of the respective phases (U phase, V phase, W phase) are calculated based on the target electricity supply amount Imt and the rotation angle Mka. Duty ratios of pulse widths of the respective phases (ratios of on-time per cycle) Dut, Dvt, Dwt are determined based on the target electricity supply amounts Iut, Ivt, Iwt of the respective phases. Then, the drive signals Su1 to Sw2 for setting the respective switching elements SU1 to SW2 configuring the bridge circuit BRG in an on-state (electricity supply state) or in an off-state (no electricity supply state) are calculated based on the duty ratios (target values) Dut, Dvt, Dwt.

The six drive signals Su1 to Sw2 independently control the electricity supply or no electricity supply state of the six switching elements SU1 to SW2. Here, an electricity supplying time per unit time is elongated in each switching element with a larger duty ratio, by which a greater amount of current flows in the coil. Thus, the rotary power of the electric motor MTR is thereby made large.

The drive circuit DRV is provided with the electricity supply amount acquiring means (for example, current sensors) IMA for the respective phases, and the actual electricity supply amounts (for example, actual current values) Iua, Iva, Iwa are acquired (detected). The detected values Iua, Iva, Iwa of the respective phases are input to the switching control block SWT. Then, a so-called current feedback control is performed so that the detected values Iua, Iva, Iwa match the target values Iut, Ivt, Iwt. Specifically, the duty ratios Dut, Dvt, Dwt are modified (finely adjusted) based on deviations between the actual electricity supply amounts Iua, Iva, Iwa and the target electricity supply amounts Iut, Ivt, Iwt. A highly accurate motor control is achieved by this current feedback control.

<Determination on Whether Swing Control is Necessary>

Figure 4:
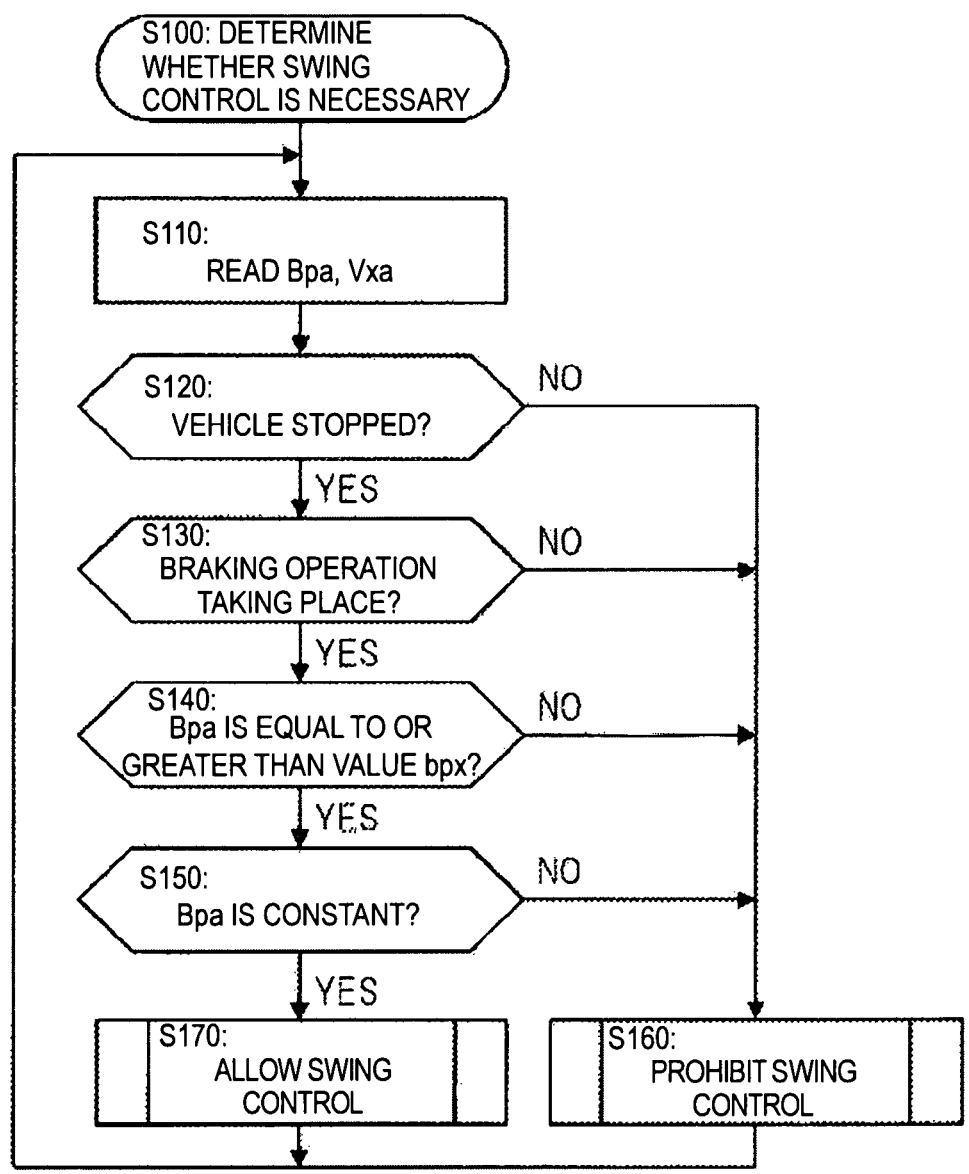
FIG. 4 is a flowchart for explaining a process to determine whether a swing control is necessary.

A determination process on whether the swing control is necessary in the swing control block FLC will be described with reference to a flowchart of FIG. 4. In the determination on whether the swing control is necessary, a determination is made on "whether to allow the swing control to be performed or not (prohibit it)".

Firstly, in step S110, the braking operation amount Bpa and the traveling speed (vehicle speed) Vxa of the vehicle are read. Next, the process proceeds to step S120.

In step S120, a determination is made on "whether the vehicle is stopped or not" based on the vehicle speed Vxa. Specifically, it is determined that "the vehicle is stopped" in a case where the vehicle speed Vxa is zero. Further, it is determined that "the vehicle is not stopped (traveling)" in a case where the vehicle speed Vxa is greater than zero. In step S120, in the case where it is affirmed that "the vehicle is stopped" (in the case of "YES"), the process proceeds to step S130. On the other hand, in step S120, in the case where it is denied that "the vehicle is stopped" (that is, the vehicle is traveling and in the case of "NO"), the process proceeds to step S160.

In step S130, a determination is made on "whether the braking is being performed or not" based on the braking operation amount Bpa. Specifically, in a case where the braking operation amount Bpa is equal to or greater than the prescribed value bp0, it is determined that "the braking is being performed". Further, in a case where the braking operation amount Bpa is less than the prescribed value bp0, it is determined that "the braking is not being performed (in a non-braking state)". In the case where it is affirmed that "the braking is being performed" in step S130 (in the case of "YES"), the process proceeds to step S140. On the other hand, in the case where it is denied that "the braking is being performed" in step S130 (that is, being in the non-braking state and in the case of "NO"), the process proceeds to step S160. The determination in step S130 may be performed based on a signal from a stop switch provided in the braking operation member BP.

In step S140, a determination is made on "whether the operation amount Bpa is equal to or greater than bpx" based on the braking operation amount Bpa. In a case where the braking operation amount Bpa is equal to or greater than the prescribed value bpx and a determination condition is affirmed (in the case of "YES"), the process proceeds to step S150. On the other hand, in a case where the braking operation amount Bpa is less than the prescribed value bpx and the determination condition is denied (in the case of "NO"), the process proceeds to step S160. Here, the prescribed value bpx is a threshold value for the determination, and is a value that is preset to be able to suppress the overheating of the electric motor MTR and the drive circuit DRV.

In step S150, a determination is made on "whether the operation amount Bpa is constant or not" based on the braking operation amount Bpa. In a case where the braking operation amount Bpa maintains a constant value and a determination condition is affirmed (in the case of "YES"), the process proceeds to step S160. On the other hand, in a case where the braking operation amount Bpa is changing and the determination condition is denied (in the case of "NO"), the process proceeds to step S160. Here, in the determination of step S150, an operation speed dBp is calculated based on the operation amount Bpa, where the affirmative determination is made in a case where the operation speed dBp is less than a prescribed value db0 (a value close to zero), and the negative determination is made in a case where the operation speed dBp is equal to or greater than the prescribed value db0.

In step S160, since the swing control does not need to be performed, performance thereof is prohibited. That is, the swing control is not started, or the performance thereof is terminated. Due to this, the swing electricity supply amount Ifc is not output from the swing control block FLC or the swing electricity supply amount Ifc is calculated to zero.

In step S170, the swing control needs to be performed, so that the performance thereof is allowed. That is, the swing control is started or the performance thereof is continued. Due to this, the swing electricity supply amount Ifc is output from the swing control block FLC to the target electricity supply amount calculation block IMT.

<Determination on Start of Swing Control and Performance Thereof>

Figure 5:
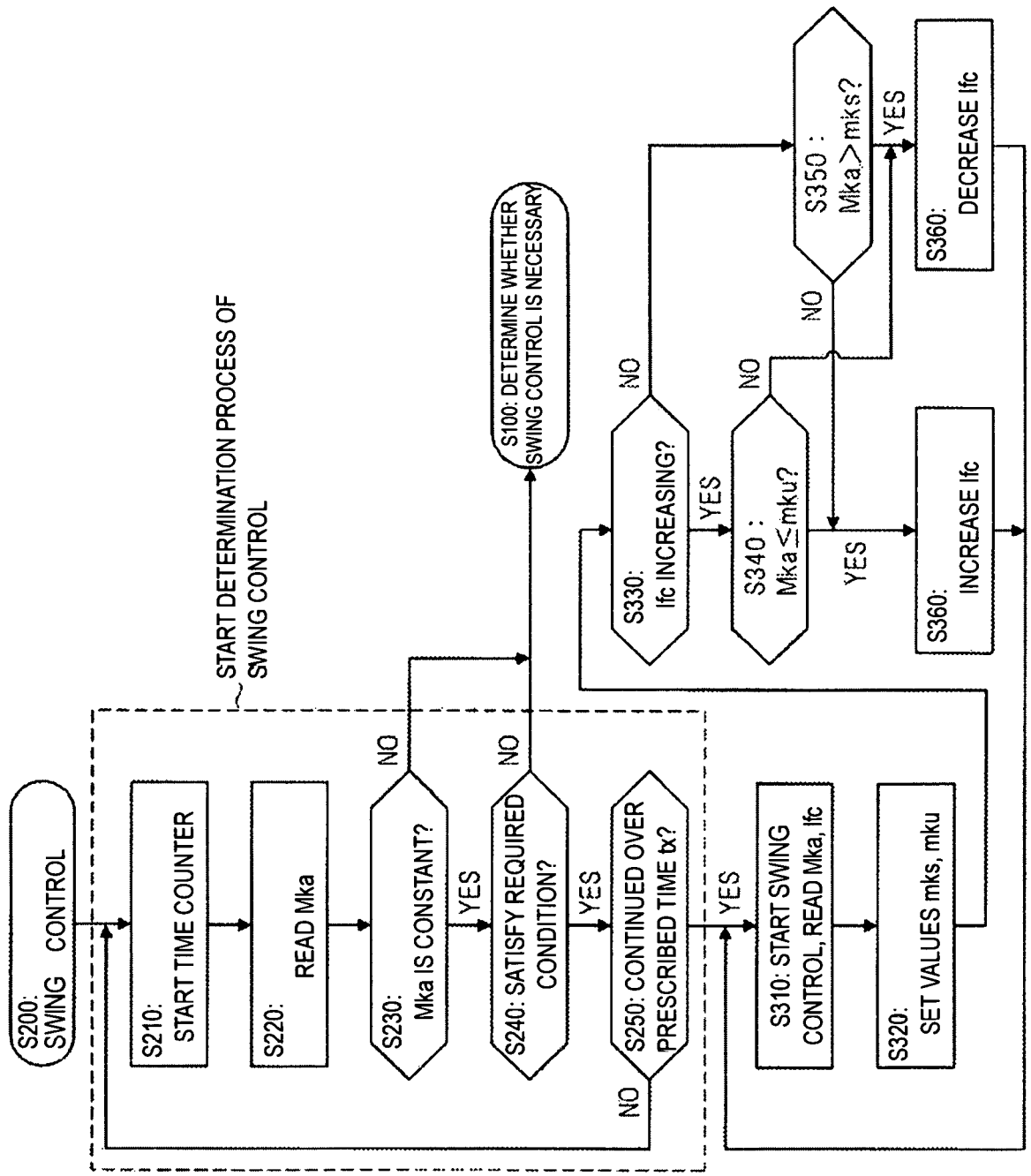
FIG. 5 is a flowchart for explaining a process of the swing control.

The process of the swing control in the swing control block FLC will be described with reference to a flowchart of FIG. 5. The "swing control" is a "control that periodically increases and decreases the rotary motion of the electric motor MTR even if the state where the braking operation amount Bpa is constant continues to take place, in the case where the vehicle is stopped, and after the rotary motion of the electric motor MTR is stopped by the braking operation amount Bpa being constant and the force which the torque applying mechanism TFK generates and the force which the torque applying mechanism TFK receives being balanced", and a control starting process and the calculation of the swing electricity supply amount Ifc for performing this control will be described. In order not to deteriorate any effect of the swing control, the liquid pressure feedback control is prohibited while performing the swing control.

Firstly, in the determination on whether the swing control is necessary, a process of step S200 is started at a time of shifting to a swing control allowed state from a swing control prohibited state. In step S210, a time counter is started. Next, in step S220, the rotation angle Mka is read. Next, the process proceeds to step S230.

In step S230, a determination is made on "whether the rotation angle Mka is constant or not" based on the rotation angle Mka. In a case where the rotation angle Mka maintains a constant value and a determination condition is affirmed (in the case of "YES"), the process proceeds to step S240. On the other hand, in a case where the rotation angle Mka is changing and the determination condition is denied (in the case of "NO"), the process is returned to step S100. Here, in the determination of step S230, a rotary speed dMk of the electric motor MTR is calculated based on the rotation angle Mka, and the affirmative determination is made in a case where the rotary speed dMk is less than a prescribed value dm0 (a value close to zero), and the negative determination is made in a case where the rotary speed dMk is equal to or greater than the prescribed value dm0.

In step S240, a determination is made on "whether required conditions for the swing control (all the determination conditions of steps S120 to S150) are satisfied or not". In a case where the determination conditions are affirmed (in the case of "YES"), the process proceeds to step S250. On the other hand, in a case where the determination conditions are denied (in the case of "NO"), the process is returned to step S100, and the process on the determination on whether the swing control is necessary is performed again.

In step S250, a determination is made on "whether the swing control allowed state continued over a prescribed time tx or not". In a case where a determination condition is denied (in the case of "NO"), the process is returned to step S210. On the other hand, in a case where the determination condition is affirmed (in the case of "YES"), the process proceeds to step S310 and the swing control is started.

The swing control is started at a time when a state in which the "rotation angle Mka is constant" and "the required conditions are satisfied" continues over the prescribed time tx. That is, the processes from step S210 to S250 correspond to a start determination process of the swing control. As above, the start determination process of the swing control has been described. Next, a performing process of the swing control will be described.

In step S310, the swing control is started. Firstly, in step S310, the rotation angle Mka and the swing electricity supply amount Ifc are read. Next, the process proceeds to step S320. In step S320, a reference value (reference angle) mks and an upper limit value (upper limit angle) mku of the rotation angle Mka for the swing control are set. Specifically, the rotation angle Mka at a time when the swing control has started (in a calculation cycle thereof) is set as the reference angle mks. Further, a prescribed value mkx is added to the reference angle mks in the forward direction of the electric motor MTR (that is, the side toward which the output of the torque applying mechanism TFK is increased and the liquid pressure from the pressure application cylinder KCL increases), so that the upper limit angle mku is set (that is, mku=mks+mkx). Next, the process proceeds to step S330.

In step S330, a determination is made on "whether the swing electricity supply amount Ifc is increasing or not" based on the swing electricity supply amount Ifc. In a case where a determination condition is affirmed (in the case of "YES"), the process proceeds to step S340. On the other hand, in a case where the swing electricity supply amount Ifc is constant or decreasing, the determination condition is denied, and the process proceeds to step S350 (in the case of "NO").

In step S340, a determination is made on "whether the rotation angle Mka is equal to or less than the upper limit angle mku or not" based on the rotation angle Mka and the stored upper limit angle mku. In a case where a determination condition is affirmed (in the case of "YES"), the process proceeds to step S360. On the other hand, in a case where the rotation angle Mka is greater than the upper limit angle mku and the determination condition is denied (in the case of "NO"), the determination condition is denied and the process proceeds to step S370.

In step S350, a determination is made on "whether the rotation angle Mka is greater than the reference angle mks or not" based on the rotation angle Mka and the stored reference angle mks. In a case where a determination condition is affirmed (in the case of "YES"), the process proceeds to step S370. On the other hand, in a case where the rotation angle Mka is equal to or less than the reference angle mks and the determination condition is denied (in the case of "NO"), the determination condition is denied and the process proceeds to step S360.

In step S360, the swing electricity supply amount Ifc is increased. Specifically, the swing electricity supply amount Ifc is increased by adding a prescribed value if0 to the swing electricity supply amount Ifc of the current calculation cycle. In step S370, the swing electricity supply amount Ifc is decreased. Specifically, the swing electricity supply amount Ifc is decreased by subtracting the prescribed value if0 from the swing electricity supply amount Ifc of the current calculation cycle. Here, the prescribed value if0 is a preset value.

As described above, after the locked state of the electric motor MTR has occurred, the swing control is allowed to be performed at the time when the conditions that the "vehicle is stopped" and the "braking operation amount Bpa is constant" are satisfied, and the swing control is started to be performed at the time when the prescribed time tx has elapsed after the rotation angle of the electric motor MTR has become constant (that is, after the rotary motion has stopped). Further, at the time when the swing control is started, the rotation angle Mka at this time is set as the reference angle mks, and the rotation angle that has been increased the reference angle mks toward the forward side of the electric motor MTR by the prescribed angle mkx is set as the upper limit angle mku. That is, the upper limit angle mku is set to the side, relative to the reference angle mks, toward which the force generated by the torque applying mechanism TFK increases. Further, the swing electricity supply amount Ifc is increased or decreased so that the rotation angle Mka changes periodically between the reference angle mks and the upper limit angle mku.

When the force generated by the torque applying mechanism TFK and the force which the torque applying mechanism TFK receives from the caliper CRP are balanced, the rotary motion of the electric motor MTR stops and the rotation angle becomes constant. That is, the electric motor MTR enters the locked state. In this locked state, the electricity supply to a specific coil and a specific switching element is continued. In the case where the operation amount Bpa is large and the electricity supply amount is large, heat generation by this continued electricity supply gives rise to the problem of the excessive temperature rise in the electric motor MTR and the drive circuit DRV. However, the swing control enables to avoidance of the continued electricity supply to the specific coil and the specific switching element, and thus, the overheating of the electric motor MTR and the drive circuit DRV can be suppressed. Further, the locked state of the electric motor MTR tends to occur when the vehicle is maintained in stop. Due to this, it is employed that the "vehicle is stopped" as the condition for the swing control to be performed. That is, since the swing control is not performed while the vehicle is traveling, a problem such as discomfort caused by deceleration of the vehicle does not occur.

Further, the swing control is performed based on the rotation angle Mka such that the rotation angle Mka increases and decreases in a range that ranges between the reference angle mks and the upper limit angle mku. Thus, the rotation angle Mka does not become less than the reference angle mks so long as the operation amount Bpa is maintained constant, and the actual liquid pressure Pca is not decreased below a value which the driver requests. Due to this, even when the swing control is being performed, the brake torque requested by the driver is surely maintained.

<Workings and Advantageous Effects of Swing Control>

Figure 6:
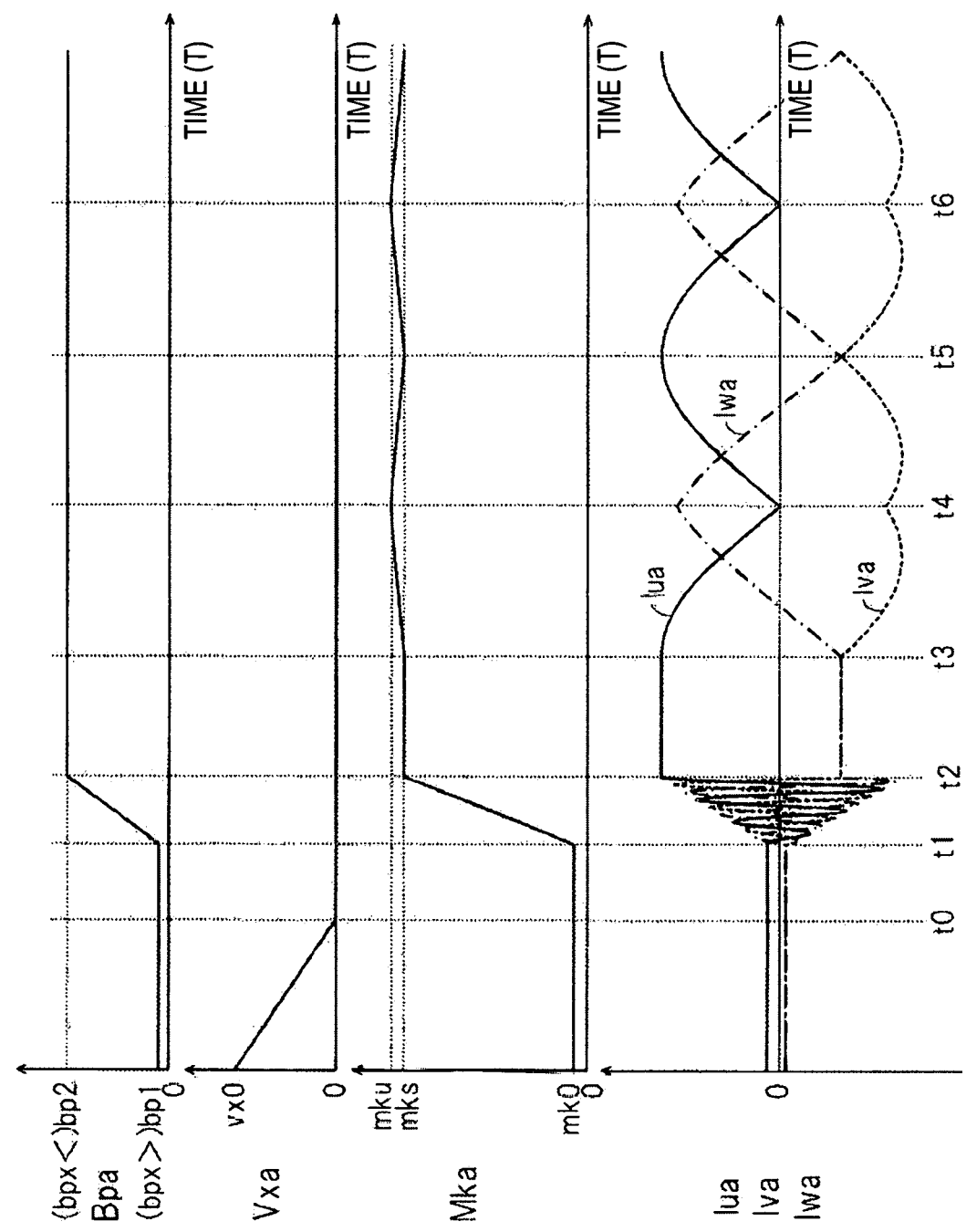
FIG. 6 is a time series diagram for explaining workings and effects of the swing control.

Workings and advantageous effects of the swing control will be described with reference to a time series diagram of FIG. 6. Here, a situation is assumed in which the driver increases the braking operation amount after the vehicle has stopped, and maintains this operation state.

Firstly, the driver maintains the braking operation member BP at an operation amount bp1, so that the traveling vehicle is decelerated. The operation amount Bpa is maintained at the constant value bp1; however, the vehicle has not stopped yet (that is, Vxa>0), and thus, the swing control is prohibited. At a time point t0, the vehicle stops. However, since the operation amount Bpa is less than bpx, the swing control prohibited state is still taking place. At a time point t1, the operation amount Bpa is increased by the driver, and from a time point t2 and thereafter, the operation amount Bpa is maintained at a constant value bp2. According to this operation, the rotation angle Mka is increased from a value mk0 corresponding to the value bp1 to a value corresponding to the value bp2, and the locked state of the electric motor MTR occurs.

Since all the required conditions of the swing control, namely the "vehicle is stopped (step S120)", the "the braking operation is being performed (step S130)", the "Bpa≥bpx (step S140)", and the "operation amount Bpa is constant (step S150)", are satisfied immediately after the time point t2, the start determination process for the swing control is started to be performed. The swing control starts to be performed at a time point t3 since the required conditions are satisfied and the rotation angle Mka is maintained its constant state from the above time point over the prescribed time tx. The rotation angle Mka at the time point t3 is set as the reference angle mks. Further, the upper limit angle mku is set in the forward direction of the electric motor MTR (that is, to the side toward which the discharge liquid pressure of the torque applying mechanism TFK increases) based on the reference angle mks.

At the time point t3 (control starting time point), since the swing electricity supply amount Ifc is not increasing (being "Ifc=0"), the swing electricity supply amount Ifc is increased first. In response to this, the target electricity supply amount Imt is increased, and the rotation angle Mka is increased from the reference angle mks. Until a time point t4, since a state in which the "swing electricity supply amount Ifc is increasing" and the "rotation angle Mka is equal to or less than the upper limit angle mku" continues, the swing electricity supply amount Ifc is gradually increased and the rotation angle Mka is also gradually increased.

At the time point t4 when the rotation angle Mka becomes greater than the upper limit angle mku, the swing electricity supply amount Ifc starts to be decreased. In response to this, target electricity supply amount Imt is decreased, and the rotation angle Mka is decreased from the upper limit angle mku. Until a time point t5, since a state in which the "swing electricity supply amount Ifc is not increasing" and the "rotation angle Mka is greater than the reference angle mks" continues, the swing electricity supply amount Ifc is gradually decreased and the rotation angle Mka is also gradually decreased.

At the time point t5, when the rotation angle Mka becomes equal to or less than the reference angle mks, the swing electricity supply amount Ifc starts to be increased. In response to this, the target electricity supply amount Imt is increased, and the rotation angle Mka is increased from the reference angle mks. From the time point t5 and thereafter, the processes of the time points t3 to t5 are repeated periodically.

As the swing electricity supply amount Ifc increases or decreases, the electricity supply amounts Iua, Iva, Iwa for the respective three phases (U phase, V phase, W phase) of the electric motor MTR change. For example, the electricity supply amount Iua of the U phase is decreased when the swing control is started and the rotation angle Mka is increased, and is increased when the rotation angle Mka is decreased. In the locked state of the electric motor MTR, since the continued electricity supply to the specific motor coil and the specific switching element is avoided by the swing control, the excessive temperature rise in the electric motor MTR and the drive circuit DRV can be suppressed.

Further, since the swing control is performed during when the vehicle is stopped, discomfort for the driver such as the variations in the decelerating speed of the vehicle can be prevented. Further, since the rotation angle mks (reference angle) at the time when the control has started is set as the reference, and the swing control is performed on the side toward which the braking liquid pressure increases (that is, on the side toward which the force generated by the torque applying mechanism TFK increases), the braking torque can be ensured for the braking request from the driver.

Figure 7:
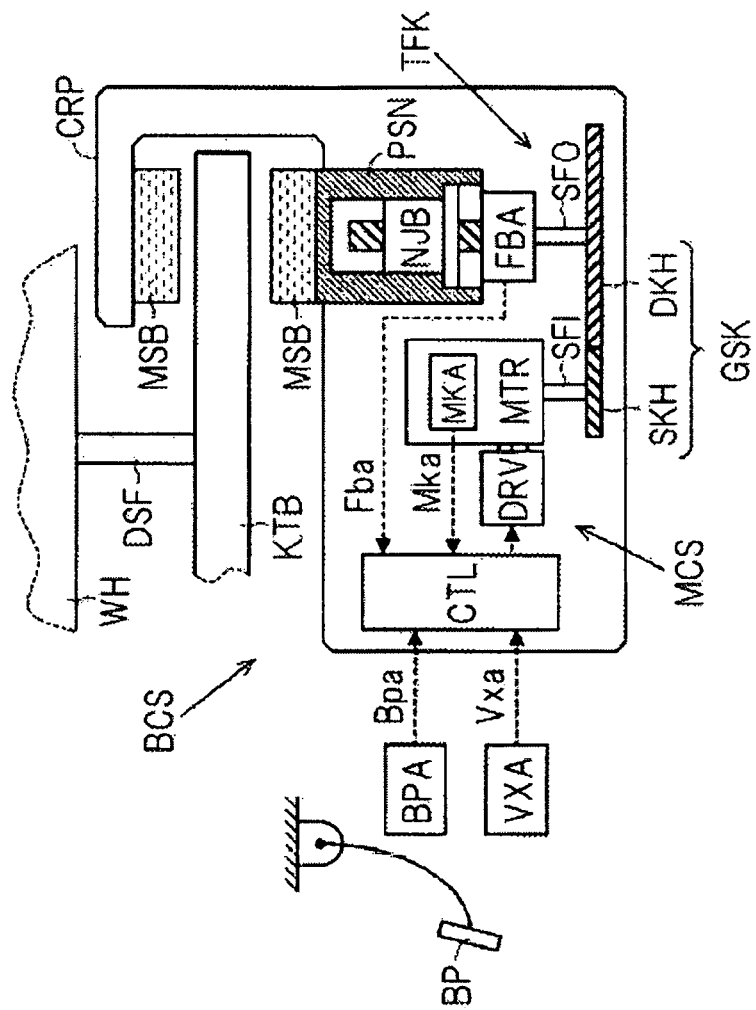
FIG. 7 is an overall configuration diagram for explaining a second embodiment of a brake control device provided with a motor control device according to the present invention.

Second Embodiment of Brake Control Device Provided with Motor Control Device According to the Present Invention Next, a brake control device BCS provided with a motor control device MCS according to the present invention will be described with reference to an overall configuration diagram of FIG. 7. In the first embodiment (see FIG. 1), the torque applying mechanism TFK applies the braking torque (braking force) to the wheels WH via the braking liquid; however, the second embodiment differs in that the braking torque (braking force) is applied directly and mechanically without intervention of the braking liquid. Thus, in the description of the second embodiment, portions that differ from the first embodiment will mainly be described. Those given the same reference signs as the first embodiment are same members and same signals, and thus duplicated descriptions therefor are omitted.

In the first embodiment, the instruction liquid pressure (target value) Pcs is calculated based on the operation amount Bpa and the target electricity supply amount Imt is determined by the liquid pressure feedback control based on the deviation ePc between the actual liquid pressure (detected value) Pca and the instruction liquid pressure Pcs. That is, the liquid pressure is employed as a control variable. On the other hand, in the second embodiment, a pressing force (force by which the friction members MSB press the rotary member KTB) is employed as the control variable. Accordingly, an instruction pressing force (target value) Fbs is calculated based on the braking operation amount Bpa, and the target electricity supply amount Imt is determined by a pressing force feedback control based on a deviation between an actual pressing force (detected value) Fba and the instruction pressing force Fbs.

The brake control device BCS is configured of an input shaft SFI, a reduction gear GSK, an output shaft SFO, a screw member NJB, a pressing piston PSN, and a pressing force acquiring means FBA. The output of the electric motor MTR (rotary power about a motor axis) is input to the reduction gear GSK through the input shaft SFI. The reduced rotary power is transferred from the reduction gear GSK to the output shaft SFO. Rotary power of the output shaft SFO (torque about an output shaft axis) is converted to linear power (thrusting force in a center axis direction of the pressing piston PSN) by the screw member NJB, and is transferred to the pressing piston PSN. Here, the reduction gear GSK and the screw member NJB correspond to a power transfer mechanism DDK.

The pressing piston PSN presses the friction members MSB against the rotary member KTB to generate a frictional force. A pressing force acquiring means (pressing force sensor) FBA is provided to acquire (detect) the force (pressing force) Fba by which the pressing piston PSN presses the friction members MSB. Further, as aforementioned, the pressing force feedback control is performed such that the actual value Fba of the pressing force matches the target value Fbs. In the second embodiment, the reduction gear GSK, the screw member NJB, the pressing piston PSN, and the pressing force sensor FBA correspond to the "torque applying mechanism TFK".

In the second embodiment as well, same swing control as the first embodiment is performed. Due to this, the effects same as the first embodiment (suppression of overheating of the electric motor MTR and the drive circuit DRV, prevention of driver's discomfort, and ensuring the braking force) can be achieved.

The invention claimed is:

1. A motor control device of a vehicle, the motor control device comprising:
    an electric motor including three coils and configured to drive an applying mechanism that applies brake torque to a wheel of the vehicle;
    a drive circuit configured to supply current independently to each of the three coils;
    a rotation angle sensor configured to detect a rotation angle of the electric motor; and
    a controller configured to:
    adjust an output of the electric motor by controlling the drive circuit based on an operation amount of a brake operating member of the vehicle;
    set the rotation angle at a time when a rotary motion of the electric motor has stopped as a reference angle; and
    set, based on the reference angle, an upper limit angle to a side toward which a force which the applying mechanism generates increases,
    wherein
    in a case where the vehicle is stopped, and
    after the rotary motion of the electric motor is stopped by the operation amount being constant and the force which the applying mechanism generates and a force which the applying mechanism receives being balanced,
    the controller performs a swing control that periodically increases and decreases the rotary motion of the electric motor even if a state where the operation amount is constant continues to take place, the swing control being performed in a range of the rotation angle ranging from the reference angle to the upper limit angle.

* * * * *